US012609418B2

(12) United States Patent
Gupta et al.

(10) Patent No.: US 12,609,418 B2
(45) Date of Patent: Apr. 21, 2026

(54) METAL CAN BATTERY WITH STEPPED ENCLOSURE

(71) Applicant: Meta Platforms Technologies, LLC, Menlo Park, CA (US)

(72) Inventors: Ankur Gupta, Redwood City, CA (US); Karthik Kadirvel, Cupertino, CA (US); Bradley Spare, San Jose, CA (US); Tianren Xu, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 570 days.

(21) Appl. No.: 18/069,653

(22) Filed: Dec. 21, 2022

(65) Prior Publication Data

US 2024/0213631 A1      Jun. 27, 2024

(51) Int. Cl.
  H01M 50/533      (2021.01)
  H01M 50/536      (2021.01)
  H01M 50/574      (2021.01)

(52) U.S. Cl.
  CPC ....... H01M 50/533 (2021.01); H01M 50/536 (2021.01); H01M 50/574 (2021.01)

(58) Field of Classification Search
  CPC ............. H01M 50/533; H01M 50/574; H01M 50/536; H01M 50/103
  USPC ........................................................ 429/163
  See application file for complete search history.

(56) References Cited

U.S. PATENT DOCUMENTS

| | | | |
|---|---|---|---|
| 6,225,778 B1 | 5/2001 | Hayama et al. | |
| 8,673,486 B2 | 3/2014 | Kwak et al. | |
| 9,373,836 B2 | 6/2016 | Inagaki et al. | |
| 9,385,349 B2 | 7/2016 | Kim et al. | |
| 9,905,891 B2 | 2/2018 | Ryu et al. | |
| 2006/0057458 A1* | 3/2006 | O'Dea ................. | H01M 50/119 429/7 |
| 2012/0114986 A1 | 5/2012 | Kim et al. | |
| 2018/0331343 A1* | 11/2018 | Wilson ................... | H01M 50/15 |
| 2018/0366690 A1* | 12/2018 | Levin ................... | H01M 50/119 |
| 2020/0176728 A1 | 6/2020 | Shiu et al. | |
| 2022/0255196 A1 | 8/2022 | Park | |
| 2023/0139645 A1* | 5/2023 | Karlsson ............. | H01M 50/103 429/163 |

OTHER PUBLICATIONS

EPO—International Search Report and Written Opinion for International Application No. PCT/US2023/084593, mailed Apr. 23, 2024, 10 pages.

* cited by examiner

*Primary Examiner* — Niki Bakhtiari
*Assistant Examiner* — Omar M Kekia
(74) *Attorney, Agent, or Firm* — McDermott Will & Schulte LLP

(57)      ABSTRACT

Can battery cells are described. The can battery cell includes a battery cell core that is housed in a rigid enclosure. The enclosure can be made of metal or other rigid material. A front face of the enclosure includes an anode tab and a cathode tab extending from the front face. A circuit module is electrically coupled to the anode tab and the cathode tab, and overlies at least a portion of the front face of the enclosure. One of the anode tab or the cathode tab is electrically coupled to the battery enclosure. The other of the anode tab or the cathode tab is electrically insulated from the enclosure. The front face includes a protrusion portion that forms a step-like structure in the front face of the enclosure.

21 Claims, 3 Drawing Sheets

METAL CAN BATTERY WITH STEPPED ENCLOSURE

BACKGROUND

Recent advances in battery technology have enabled powerful portable and wearable electronic devices, such as VR/AR headsets, smart watches, smart rings, and drones, that require considerable amounts of electrical energy. The electrical energy requirements of these devices coupled with the continual demand for smaller and/or more powerful electronic devices makes it difficult to adequately power the devices. Conventional can battery cells are useful and cost effective for larger devices. However, existing can battery cells are available in limited sizes (e.g., thickness and length), shapes, and configurations, and conventional can battery cells are not always available to meet the requirements of powerful small devices.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Figures 1, 2, 3:
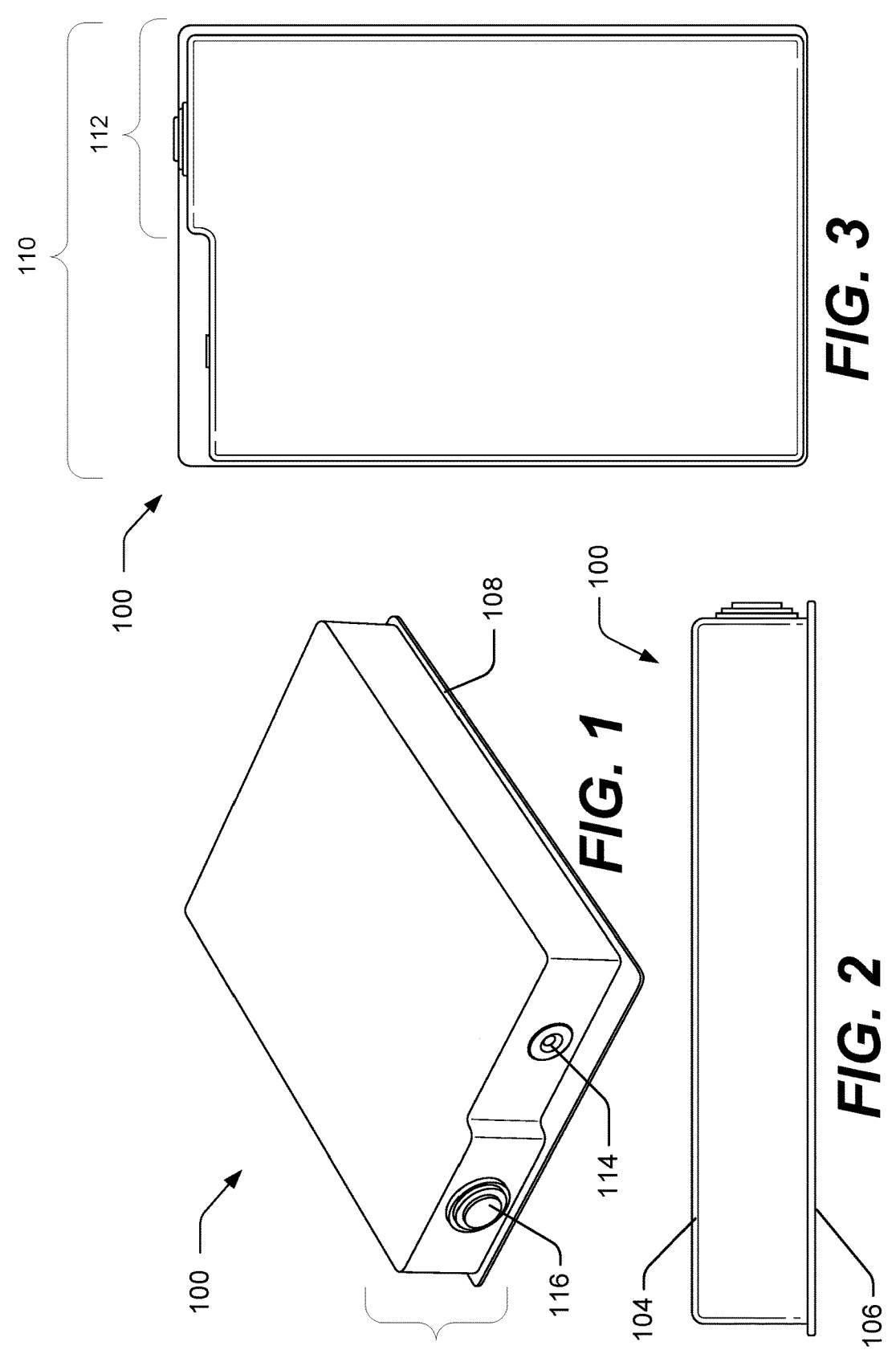
FIG. 1 illustrates a perspective view of an example of a can battery in accordance with this disclosure.
FIG. 2 illustrates a side view of the can battery.
FIG. 3 illustrates a top view of the can battery.

While conventional can battery cells are suitable for powering certain portable electronic devices, such as by way of example and not limitation, drones, extended reality headsets (e.g., augmented reality, virtual reality, and/or mixed reality headsets, which may be referred to herein simply as "headsets"), smart glasses, smart rings, or other wearable electronic devices, some portable electronic devices may have requirements that are not possible or practical to meet with conventional can battery cells. For example, conventional batteries, such as those used in laptops and cell phone batteries are limited to the amount available output power due to the limited amount of available space within the battery. Additionally, in order to improve user comfort, portable electronic devices often have complex geometries with non-standard shapes and/or space limitations that limit the amount of energy the battery can store.

This disclosure describes can batteries with stepped or otherwise non-standard enclosures and techniques for manufacturing such can batteries with stepped and/or non-standard enclosures. The enclosures can be formed of a rigid or semi-rigid material. In some examples, the enclosures may have a relatively thin wall thickness. By way of example and not limitation, the wall thickness may be in the range of about 0.05 mm to about 0.50 mm thick.

In some examples, the can batteries include a metal enclosure made of steel, aluminum, copper, tin, magnesium, nickel, stainless steel, titanium, or other metals. However, in other examples, all or part of the can battery be made of other materials. In some examples, the enclosures can be made of a material that is electrically conductive. However, in other examples, all or part of the enclosure can be made of an insulative or non-conductive material. In some examples, an interior and/or exterior of the enclosure may be coated or lined with another material to provide a corrosion resistant barrier, a moisture resistant barrier, an air impermeable barrier, a thermally insulative surface, or the like.

In some examples, the can batteries described in this disclosure may have a higher energy density (e.g., higher storage capacity per volume), and consequently a higher energy storage capacity, than comparably sized batteries made using traditional can battery manufacturing techniques or other manufacturing techniques (e.g., pouch batteries). In some instances, the can battery may include a metal enclosure that encases a battery cell core. The metal enclosure may include a metal can and a metal lid, where the battery cell core sits in the metal can and is covered with a substantially planer metal lid. In some examples, the metal enclosure may include two metal can halves (e.g., clam shell cans) which each partially enclose the battery cell core. In either case, the battery cell core may be hermetically sealed in the enclosure by welding the metal can to the metal lid (or second metal can) around a perimeter of the interface between the metal can and the metal lid (or second metal can). The second metal can or the metal lid may have a same or different thickness than the first enclosure. By way of example and not limitation, the wall thickness may be in the range of about 0.05 mm to about 0.50 mm thick.

In some instances, the metal enclosure includes a front face. An anode tab and/or a cathode tab may be formed on the front face of the metal enclosure. The anode tab or the cathode tab may be in electrical contact with the metal enclosure. In that case, the respective tab that is in electrical contact with the metal enclosure will be at the same electrical potential as the metal enclosure. The other of the anode tab or cathode tab (whichever is not in electrical contact with the metal enclosure) may be electrically insulated from the metal enclosure. A circuit module may be electrically coupled to the anode tab and the cathode tab. In some instances, the circuit module may be positioned adjacent and/or substantially parallel to at least a portion of the front face of the metal enclosure. Respective weld tabs may be welded between the circuit module and the anode tab, and between the circuit module and the cathode tab. The circuit module can include a protection circuit module (PCM) that contains one or more sensors and/or switches that monitor and manage the safety functions of the metal can battery (i.e., over-voltage, under-voltage, over temperature, under temperature, etc.).

As mentioned above, the anode tab and the cathode tab are electrically isolated from other by insulation between at least one of the anode tab or the cathode tab and the metal enclosure. This insulation may create a void or gap within the metal housing, or a void directly adjacent to the metal housing between the metal housing and the circuit module. The front face of the metal enclosure may include a protrusion configured around the void. The protrusion in the front face may form a step in the front face of the metal housing. One of the anode tab or cathode tab may extend from the protrusion in the front face. In this case, the circuit module may be positioned alongside a portion of the front face that doesn't include the protrusion (e.g., the circuit module may be positioned to the side of, offset from, or adjacent to, the protrusion) so that that circuit module does not extend further from the face of the enclosure than the protrusion or does not extend as far from the face of the enclosure as it otherwise would if the circuit module spanned the portion of the enclosure having the protrusion.

However, in some instances, the circuit module may face, be disposed on, be aligned with, or otherwise span at least a portion of the enclosure having the protrusion. In that case, one of the anode tab or cathode tab may be formed on the portion of the front face that does not include the protrusion.

In other instances, the protrusion portion may include a first protrusion portion and a second protrusion portion formed on the front face. In that case, the circuit module may be disposed on, facing, aligned with, and/or may span at least a portion of both the first protrusion portion and second protrusion portion. In some examples, the circuit module can be configured to extend into a space between the first protrusion portion and the second protrusion portion.

The battery cell core may be formed to have a shape that compliments the metal enclosure, including the protrusion of the front face. In some instances, the battery cell core may extend within the protrusion of the front face. This utilizes the void that is formed within the metal housing and maximizes the storage capacity of the metal can battery. Regarding the shape of the metal can battery, the metal can battery may have a rectangular outer profile or perimeter when viewed from the top such that the length of the metal can battery is greater than its width. The front face may extend in a length direction along the width of the metal can battery. In some instances, the length of the metal can battery can be less than about 50 mm. In some instances, the width of the metal can battery can be less than about 50 mm. In some instances, the thickness of he metal can battery can be less than about 6 mm. In some instances, the protrusion portion of the metal can battery can have a length of about 2 mm. In some instances, the protrusion portion of the metal can battery can have length of about 3 mm. In other examples, however, other non-rectangular peripheral shapes may be used (e.g., trapezoidal, L-shaped, circular, ovoid, hexagonal, etc.) and steps or protrusions may be formed in any or all of the peripheral sides, the top surface, and/or the bottom surface.

In some instances, the anode tab or the cathode tab that is electrically insulated from the metal enclosure, and the circuit module, may extend from the front face to a plane that is spaced a distance from the front face. In this case, the anode tab or cathode tab may have a thickness that is less than the thickness of the circuit module.

FIGS. 1-3 illustrate multiple viewpoints of the disclosed metal can battery 100. The metal can battery 100 can include a metal enclosure 102 that encases a battery cell core (not shown). The battery cell core can be encased within a metal can 104 and a metal lid 106 where the battery cell core sits in the metal can 104 and is covered with the metal lid 106. In some examples, the metal can 104 includes a flange 108 around all or a portion of a perimeter of an opening of the metal can 104. The battery cell core can be hermetically sealed within the metal enclosure 102 by welding the metal can 104 to the metal lid 106 along the flange 108. In other examples, however, the flange 108 may be omitted and the metal lid 106 may be welded to the metal can 104 directly a rim of the opening of the metal can 104. Additionally, or alternatively, the lid may include a flange or flared portion which overlaps a peripheral wall (including the front face) of the metal can 104 and the flange or flared portion of the metal lid 106 can be welded to the metal can 104. In still other examples, the metal lid may itself comprise a can having a depth dimension (rather than being substantially planar), such that the metal can 106 and the metal lid 104 form a clamshell structure to enclose the battery cell core and the metal can 106 and the metal lid 104 may be secured to one another around a seam or interface at which the metal can 106 and the metal lid 104 meet. Regardless of the configuration of the metal lid 104 (substantially planar, flanged, flared, or clamshell), the front face 110 of the metal enclosure 102 includes a protrusion portion 112 that forms the stepped enclosure of the metal can battery 100. An anode tab 114 and a cathode tab 116 can be disposed to pass through the front face 110. In this case, the cathode tab 116 is formed on the protrusion portion 112 of the front face 110, and the anode tab 114 is formed adjacent to and spaced from the protrusion portion 112 (i.e., in the recessed portion of the front face). Additionally, the metal can enclosure 102 can have a rectangular shape where is length is greater than its width. In the illustrated example, the front face 110 comprises a peripheral wall of the metal can 104 which extends in the widthwise direction (one of the short sides) of the metal can enclosure 102. In other examples, however, the front face 110 may extend in a lengthwise direction (one of the long sides) of the metal can enclosure 102.

While examples are described herein in which the metal lid 104 is secured to the metal can 106 by welding, in some examples, the metal lid 104 may additionally or alternatively be secured to the metal can 106 by soldering, brazing, crimping, adhesive, and/or other securing means.

Figure 4:
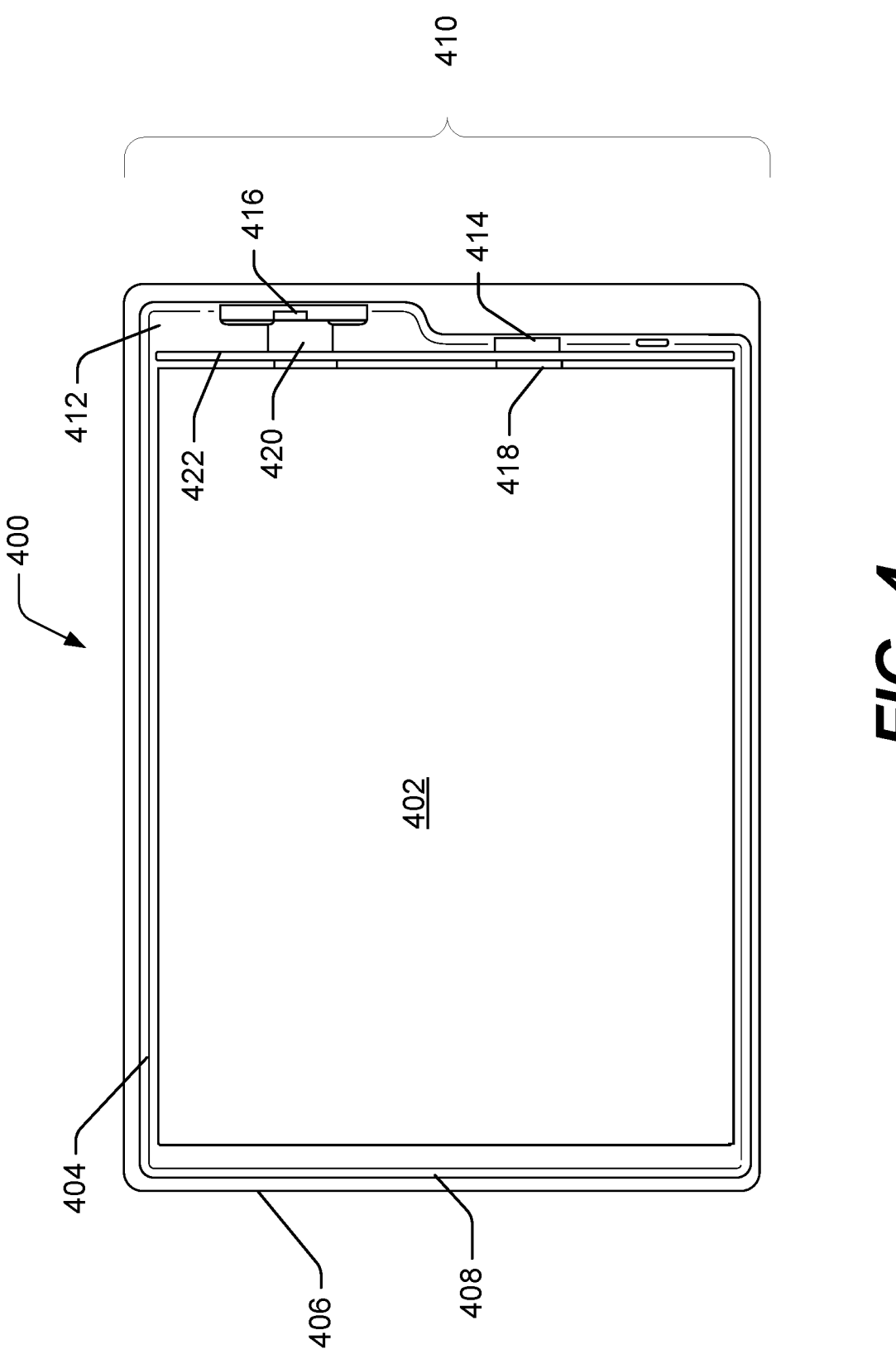
FIG. 4 illustrates a top view of a can battery and its internal structures in accordance with an example of this disclosure.

FIG. 4 illustrates a top view of the metal can battery 400 and its internal structures. The battery cell core 402 can be enclosed by the metal can 404 and the metal lid 406. The metal can 404 and the metal lid 406 can hermetically seal battery cell core 402 along the flange 408 of the metal can battery 400. The flange 408 can be disposed around all or portion of the perimeter of the metal lid 406. However, in some examples, the flange 408 can be omitted and the metal can 404 and metal lid 406 may be sealed at a rim of the metal can 404. Similar to FIGS. 1-3, the metal can battery 400 can have a rectangular shape or any other suitable shape. The front face 410 includes an anode tab 414 and a cathode tab 416. Additionally, a protrusion portion 412 can be formed in the front face 410 regardless of the shape of the metal can battery 400. The cathode tab 416 can be disposed to pass through the protrusion portion 412 of the front face 410 and the anode tab 414 can be disposed adjacent to or spaced from the protrusion portion 412 (i.e., in the recessed portion of the front face). The anode tab 414 and cathode tab 416 can be electrically coupled with the battery cell core 402 via a first weld tab 418 and a second weld tab 420.

Additionally, the cathode tab 416 can be electrically isolated from the metal can 404 and metal lid 406. A circuit module 422 can be electrically coupled to the cathode tab 416 and disposed adjacent to and/or substantially parallel to at least a portion of the protrusion portion 412. The circuit module 422 can include a protection circuit module (PCM) that contains one or more sensors and/or switches that monitor and manage the safety functions of the metal can battery (i.e., over-voltage, under-voltage, over temperature, under temperature, etc.).

The circuit module 422 can have a rectangular shape as illustrated in FIG. 4. The circuit module 422 can have a thickness, where the size of the protrusion portion 412 (width and distance of protrusion from the front face 410) can be based at least in part on the thickness of the circuit module 422. In this case, if the circuit module 422 is made thinner, then the protrusion portion 412 can also be made smaller. For small cell batteries, the protrusion portion 412 can provide the metal can battery 400 with an energy storage capacity that is at least 5% greater than battery that does not include the protrusion portion 412.

Figures 5, 6, 7:
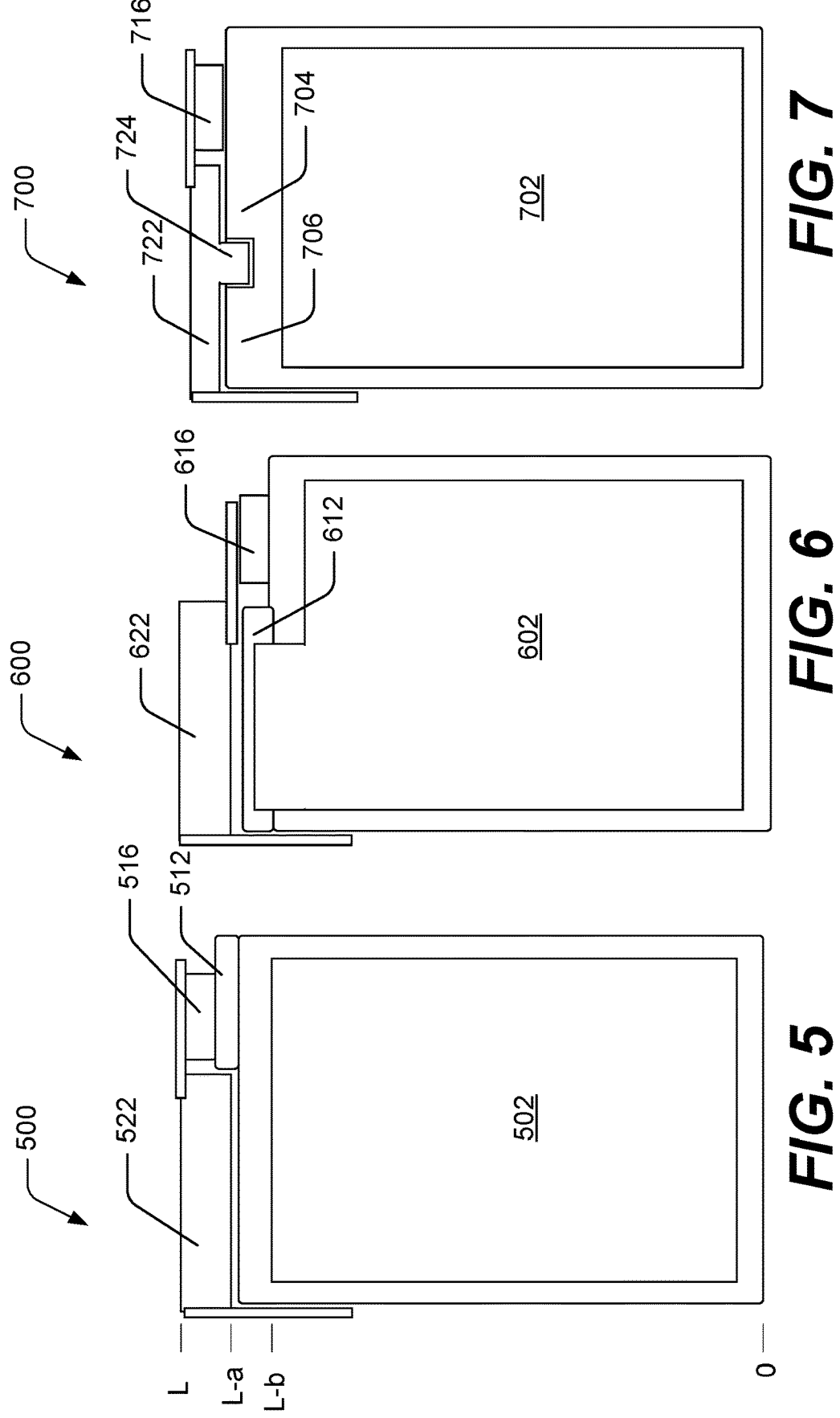
FIGS. 5-7 illustrate multiple configurations of a can battery in accordance with examples of this disclosure.

FIGS. 5-7 illustrate a few, non-limiting, configurations that metal can batteries 500, 600, and 700 can have according to this disclosure. FIG. 5 illustrates a protrusion portion 512 that extends from the front face to a length L-a. In that case, the cathode tab 516 extends from the protrusion portion 512 to a length L. The circuit module 522 can be disposed adjacent to and/or substantially parallel to at least a portion of the front face and adjacent to the protrusion portion 512. The circuit module 522 can extend to a length L. The size of the protrusion portion 512 (width and distance of protrusion from the front face) can be based at least in part on the thickness of the circuit module 522. In this case, the protrusion portion 512 with the cathode tab 516 extend to the same length L of the metal can battery 500. The battery cell core 502 can extend to a length L-b and thereby utilizes the space around and/or immediately adjacent to the protrusion portion 512. By way of example and not limitation, L-a may be in the range of less than about 50 mm.

FIG. 6 illustrates a protrusion portion 612 that extends from the front face to a length L-b. The cathode tab 616 is disposed on the front face and is adjacent to the protrusion portion 612. The cathode tab 616 and the protrusion portion 612 extend to the same length L-b. Additionally, the circuit module 622 is disposed on the front face and extends from the protrusion portion 612 to a length L. The battery cell core 602 utilizes the space or gap created by the protrusion portion 612 and extends into the protrusion portion to a length L-b. Utilizing this space within the protrusion portion 612 can provide an energy storage capacity that is at least 5% greater than battery that does not include the protrusion portion 612. By way of example and not limitation, L-b may be in the range of less than about 54 mm.

FIG. 7 illustrates a first protrusion portion 704 and a second protrusion portion 706 that extends to a length L-a. The cathode tab 716 can be disposed on first protrusion portion 704 and can extend to a length L. The circuit module 722 can be positioned adjacent to and/or substantially parallel to at least a portion of both the first protrusion portion 704 and the second protrusion portion 706. Unlike FIG. 5 and FIG. 6, it is not required that the circuit module 722 have a rectangular shape. In this case, the circuit module 722 can have an irregular shape and can include a dent portion 724 that extends into a space on the front face between the first protrusion portion 704 and the second protrusion portion 706. The circuit module 722 is codesigned with the protrusion portions to include the dent portion 724. The battery cell core 702 can extend to a length L-b and thereby efficiently utilizes the space around the first protrusion portion 704 and the second protrusion portion 706.

CONCLUSION

Although the discussion above sets forth example implementations of the described techniques, other architectures may be used to implement the described functionality, and are intended to be within the scope of this disclosure.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

For example, while the example battery enclosures are described as being made of metal, in other examples, the enclosures can be made of ceramic, polymer, fiber glass, carbon fiber, glass, or other materials. Such non-metal enclosures can be made by injection molding, blow molding, casting, forming, extruding, or other conventional manufacturing techniques. In the case of non-metal enclosures, the lid or cover can be adhered to the can enclosure by ultrasonic welding, heat staking, adhesive, a gasket or seal, or bonding or sealing means. In the case of non-metal enclosures, at least a portion of the enclosure may be made of or coated with an electrically conductive material, a corrosion resistant material, a moisture or air barrier material, a thermally insulative, or the like.

As still other examples, the battery cell core can be housed in a metal enclosure that includes a metal can and a metal lid. A protrusion can be formed in a side surface of the metal can by pressing or stamping the protrusion into the surface. In some instances, one protrusion can be formed in the surface. In other examples, multiple protrusions can be formed in the surface. The metal enclosure can be hermetically sealed by welding the metal lid to the metal can. The seal can include a flange. In other examples, the seal does not include a flange.

In some examples, a cathode tab and an anode tab can be electrically coupled to the battery cell core. The anode tab can be electrically coupled to the metal enclosure and the cathode tab can be electrically insulated from the metal enclosure. In other examples, the anode tab can be electrically insulated from metal enclosure and the cathode tab can be electrically coupled to the metal enclosure.

In some examples, circuit module can be electrically coupled to the anode tab and the cathode tab. The circuit module can be positioned to face the protrusion in the side surface of the metal enclosure and the cathode tab (or the anode tab) can be positioned to face a recess in the surface adjacent to the protrusion. In other instances, the circuit module can be positioned to face a recess in the side surface adjacent to the protrusion and the cathode tab (or the anode tab) can be positioned to face the protrusion in the side surface.

In cases where the side surface include multiple protrusion, the circuit module can be positioned to face at least a portion of two protrusions. Further, the circuit module can extend into a recess between two adjacent protrusions. In some examples, the battery cell core can have a shape that compliments the shape of the metal enclosure. In other examples, the battery cell core can have shape that compliments the shape of the metal enclosure and can extend into the protrusion formed in the side surface of the metal enclosure.

Further, the specific features and acts are disclosed as exemplary forms of implementing the claims. For example, the structural features and/or methodological acts may be rearranged and/or combined with each other and/or other structural features and/or methodological acts. In various examples, one or more of the structural features and/or methodological acts may be omitted.

What is claimed is:

1. A device, comprising:
   a metal enclosure;
   a battery cell core housed in the metal enclosure;
   an anode tab and a cathode tab electrically coupled to the battery cell core and protruding from a front face of the metal enclosure; and
   a circuit module electrically coupled to the anode tab and the cathode tab, wherein the circuit module faces at least a portion of the front face of the metal enclosure, wherein one of the anode tab or the cathode tab is electrically coupled to the metal enclosure and another of the anode tab or the cathode tab is electrically insulated from the metal enclosure, and wherein the front face of the metal enclosure includes a protrusion portion that protrudes from the front face in a direction away from the battery cell core, and wherein the cathode tab is formed on the protrusion portion.

2. The device of claim 1, wherein the battery cell core has a shape that compliments a shape of the metal enclosure.

3. The device of claim 1, wherein the cathode tab that is electrically insulated from the metal enclosure extends from the protrusion portion, and the circuit module faces at least a recess of the front face that is adjacent to the protrusion portion.

4. The device of claim 1, wherein the anode tab that is electrically insulated from the metal enclosure extends from a recess of the front face that is adjacent to the protrusion portion, and the circuit module faces at least the protrusion portion.

5. The device of claim 1, wherein the battery cell core extends into the protrusion portion.

6. The device of claim 1, wherein the protrusion portion is a first protrusion portion, the front face of the metal enclosure further comprising a second protrusion portion, wherein the circuit module faces at least a portion of the first protrusion portion and at least a portion of the second protrusion portion, and the circuit module extends into a gap between the first protrusion portion and the second protrusion portion.

7. The device of claim 1, further comprising a width and a length, wherein the length is greater than the width, the front face extends in a length direction along the width of the device, and the length of the device is less than about 50 mm.

8. The device of claim 1, wherein the anode tab or cathode tab that is electrically insulated from the metal enclosure and the circuit module extends from the front face to a plane that is spaced a distance from the front face.

9. The device of claim 8, wherein the anode tab or cathode tab that is electrically insulated from the metal enclosure has a thickness that is less than a thickness of the circuit module.

10. The device of claim 1, wherein the circuit module is electrically coupled to the anode tab via a first weld tab, and the circuit module is electrically coupled to the cathode tab via a second weld tab.

11. A method for forming a device, comprising:

forming a metal enclosure including a protrusion formed into a portion of a periphery of the metal enclosure in a direction away from the battery cell core;

housing a battery cell core in the metal enclosure;

forming an anode tab and a cathode tab that protrudes from a front face of the metal enclosure, wherein the cathode tab is formed on the protrusion;

electrically coupling the anode tab and the cathode tab to the battery cell core;

electrically insulating the one of the anode tab or cathode tab from the metal enclosure;

electrically coupling another of the anode tab or cathode tab to the metal enclosure; and electrically coupling a circuit module to the anode tab and the cathode tab, wherein the circuit module faces at least a portion of the front face of the metal enclosure, and the front face of the metal enclosure includes at least a portion of the protrusion.

12. The method of claim 11, wherein the battery cell core is formed to have a shape that compliments a shape of the metal enclosure.

13. The method of claim 11, wherein the or cathode tab that is electrically insulated from the metal enclosure extends from the protrusion, and the circuit module faces at least a portion of the front face that is adjacent to the protrusion.

14. The method of claim 11, wherein the anode tab that is electrically insulated from the metal enclosure extends from a portion of the front face that is adjacent to the protrusion, and the circuit module faces the protrusion.

15. The method of claim 11, wherein the battery cell core extends into at least a portion of the protrusion.

16. The method of claim 11, wherein the protrusion is a first protrusion, the front face of the metal enclosure further comprising a second protrusion, wherein the circuit module faces at least a portion of the first protrusion and the second protrusion, and the circuit module extends into a gap between the first protrusion and the second protrusion.

17. The method of claim 11, wherein the device comprises a width and length, wherein the length is greater than the width, wherein the front face extends in a length direction along the width of the device, and wherein the length of the device is less than about 50 mm.

18. The method of claim 11, wherein the anode tab or cathode tab that is electrically insulated from the metal enclosure, and the circuit module extends from the front face to a plane that is spaced a distance from the front face.

19. The method of claim 18, wherein the anode tab or cathode tab that is electrically insulated from the metal enclosure has a thickness that is less than a thickness of the circuit module.

20. The method of claim 11, wherein the circuit module is electrically coupled to the anode tab via a first weld tab, the first weld tab is welded to the circuit module and the anode tab, and wherein the circuit module is electrically coupled to the cathode tab via a second weld tab, and the second weld tab is welded to the circuit module and the cathode tab.

21. The method of claim 11, wherein the protrusion is formed by stamping or pressing a protrusion into a sidewall of the metal enclosure.

* * * * *